United States Patent [19]
Bielecki et al.

[11] Patent Number: 5,855,664
[45] Date of Patent: Jan. 5, 1999

[54] SOLID WASTE LANDFILL COVER MATERIAL AND METHOD OF EXTENDING THE USEFUL LIFE OF A SOLID WASTE DISPOSAL LANDFILL

[75] Inventors: Adam J. Bielecki, 913A U.S. 27 South, Avon Park; Robert Harrington, Sebring, both of Fla.

[73] Assignee: Adam J. Bielecki, Pembroke Pines, Fla.

[21] Appl. No.: 921,750

[22] Filed: Aug. 27, 1997

[51] Int. Cl.$^6$ ............................ C04B 18/04; B09B 1/00
[52] U.S. Cl. .................. 106/697; 106/18.11; 106/18.13; 404/82; 405/129; 405/258; 405/271; 405/128; 427/421; 241/DIG. 38
[58] Field of Search ................. 106/697, 15.05, 106/18.11, 18.13, 18.14, 18.15, 18.16, 18.26, 18.21, 900; 427/421; 71/904, 9; 252/2, 88.1; 404/76, 82; 405/128, 129, 258, 271; 241/DIG. 38

[56] References Cited

U.S. PATENT DOCUMENTS

| | | | |
|---|---|---|---|
| 3,637,022 | 1/1972 | Kelly et al. | 252/2 |
| 5,181,795 | 1/1993 | Circeo, Jr. et al. | 405/128 |
| 5,185,214 | 2/1993 | LeVan et al. | 106/15.05 |
| 5,194,174 | 3/1993 | Roe et al. | 252/88.1 |
| 5,244,311 | 9/1993 | Galante | 405/129 |
| 5,314,266 | 5/1994 | Smith et al. | 405/129 |
| 5,320,450 | 6/1994 | Smith | 405/121 |
| 5,362,181 | 11/1994 | DenBesten | 405/129 |
| 5,468,291 | 11/1995 | Waterson et al. | 106/900 |
| 5,534,301 | 7/1996 | Shutt | 106/15.05 |
| 5,605,417 | 2/1997 | Englert et al. | 405/129 |

*Primary Examiner*—Michael Marcheschi
*Attorney, Agent, or Firm*—Robert M. Downey, PA

[57] ABSTRACT

A method of manufacturing Construction and Demolition ("C&D") disposal debris into a substitute/alternative daily/initial cover product approved by an environmental regulatory authority for use at a solid waste disposal landfill, wherein the C&D disposal debris, before processing/manufacturing, is considered a raw material/feed stock composed of a commingled inseparable mixture of solid waste components/items which are classified based on their origin as C&D disposal debris. These components are mechanically processed by screening or shredding to a predetermined specification particle size to collectively create/form a "C&D Recovered Screen Material" ("RSM") product. This C&D-RSM product is applied as daily/initial cover material covering compacted and leveled Municipal Solid Waste ("MSW") substituting the normally used sand, dirt or earthen materials at permitted/licensed MSW disposal landfills operating with a landfill leachate containment system or other approved site location. Once applied, this manufactured MSW disposal landfill substitute C&D-RSM daily cover product is treated with a formulated solution in order to meet the required environmental regulatory authority specifications necessary for any product or material to be approved by them as a MSW disposal landfill daily/initial cover material or as a substitute daily/initial cover product.

23 Claims, 1 Drawing Sheet

FIG. 1

SOLID WASTE LANDFILL COVER MATERIAL AND METHOD OF EXTENDING THE USEFUL LIFE OF A SOLID WASTE DISPOSAL LANDFILL

BACKGROUND OF THE INVENTION

1. Field of the Invention

This invention relates generally to a manufactured, partially biodegradable municipal solid waste ("MSW") disposal landfill specification daily/initial cover product.

More specifically, this invention relates to a MSW disposal landfill substitute/alternative daily/initial cover product composed of C&D disposal debris which has been mechanically processed by screening/shredding to a predetermined specification maximum particle size.

2. Description of the Related Art

Environmental regulations governing solid waste material are found at 40 Code of Federal Regulations (C.F.R.) Part 258, Criteria for Municipal Solid Waste Facilities, 40 Code of Federal Regulations (C.F.R.) Part 261.2.; Definition of Solid Waste, Florida Statutes (F.S.) Chapter 403, Environmental Control and the Florida Administrative Code (F.A.C.) Chapter 62-701, Solid Waste Management Facilities (Apr. 23, 1997) incorporated herein by reference. Additionally, the Standard Industrial Classification (S.I.C.) Manual, printed by the Executive Office of the President Office of Management and Budget is also incorporated herein by reference.

In the solid waste industry, it is the origin of the components of the unwanted solid waste which determines its solid waste classification. "Origin" denotes the type of activity conducted at the specific geographic site location where the unwanted solid waste material originated from, was generated at or produced. As an example, based upon their "origins" the following solid waste classifications are used: residential, commercial, construction, demolition, lot clearing, site development, manufacturing, industrial, yard trash/yard waste also known as green waste and the like. Furthermore, documents such as certificate of use, certificate of occupancy, occupational licenses, building construction permits, demolition permits, lot clearing permits and the like provide useful information in determining solid waste material classifications. These issued documents provide the necessary information to the appropriate agencies of towns, cities, municipalities, counties, state and environmental regulatory authorities or the like.

Upon review (examination) of these issued documents, the solid waste generated/produced at the specific site location in question and its classification can accurately be determined. Furthermore, zoning codes, comprehensive land use master plans and the like can also be used to determine solid waste classifications. Once the classification of the solid waste has been accurately established, the proper disposal location approved by environmental regulatory authorities for this specific type of solid waste can be made. Additional information on the classification of solid waste entering a permitted/licensed or approved solid waste management facility can be obtained from the facility's required operational record.

Operational records such as Monthly Operating Reports ("MOR's") are usually required by all permitted/licensed or approved solid waste management facilities or the like. The requirement of compiling the MOR from the daily operational records is usually included/attached as a "specific condition" to the permit/license issued to the solid waste management facility. An example of this MOR requirement is found in the State of Florida's Administrative Code (F.A.C. Chapter 62-701 Solid Waste Management Facilities, dated Apr. 23, 1997, Section 801, General Permit for Solid Waste Transfer Stations (4)(g), and is included herein:

(4)(g) Operational records shall be maintained to include a daily log of the quantity of solid waste received and transported and the origin of the waste. Such records shall be compiled on a monthly basis and shall be available for inspection by the Department. Reports shall be retained at the station for three years. Review of the required daily operational records should clearly indicate the exact geographic site location of the "origin" of the solid waste.

A determination can then be easily made as to the classification of the solid waste received from that specific location and the correct type of solid waste management facility where that specific solid waste is to be abandoned by disposal.

As an example, solid waste generated/produced by industries listed under the Standard Industrial Classification (S.I.C.) Manual industrial code 1152-1794 and 1796-1799 are classified as construction solid waste. Solid waste generated/produced by the S.I.C. industry code number of 1795 is classified as demolition solid waste.

Construction and Demolition (C&D) debris is considered solid waste by environmental regulatory agencies because in most instances, the C&D debris is simply abandoned by being disposed of, burned or incinerated. Construction and Demolition (C&D) Debris, as used herein and as defined by the State of Florida's Administrate Code (F.A.C.) is found at Chapter 62 Part 701 (62-701 ) Solid Waste Management Facilities, dated Apr. 23, 1997, Section 200 Definitions, (25) "Construction and Demolition Debris" is included herein.

(25) Construction and demolition debris" means discarded materials generally considered to be not water soluble and non-hazardous in nature, including but not limited to steel, glass, brick, concrete, asphalt material, pipe, gypsum wallboard and lumber, from the construction or destruction of a structure as part of a construction or demolition project or from the renovation of a structure, including such debris from construction of structures at a site remote from the construction or demolition project site. The term includes rocks, soils, tree remains, trees and other vegetative matter which normally results from land clearing or land development operations for a construction project; clean cardboard, paper, plastic, wood, and metal scraps from a construction project. Effective Jan. 1, 1997, except as provided in Section 403.707 (13)(j), F.S., unpainted, non-treated wood scraps from facilities manufacturing materials used for construction of structures or their components and unpainted, non-treated wood pallets provided the wood scraps and pallets are separated from other sold waste where generated and the generator of such wood scraps or pallets implements reasonable practices of the generating industry to minimize the commingling of wood scraps or pallets with other solid waste, and de minimis amounts of other non-hazardous wastes that are generated at construction or demolition projects, provided such amounts are consistent with best management practices of the construction and demolition industries. Mixing of construction and demolition debris with other types of solid waste will cause it to be classified as other than construction and demolition debris.

Therefore, solid waste material generated by construction and/or demolition activity is classified as Construction and Demolition (C&D) debris by environmental regulatory authorities providing it has not been allowed to become mixed or commingled with any other classification of solid waste disposal material. Specifically excluded from the definition of C&D debris is asbestos and/or asbestos waste, biological/biomedical waste and all hazardous waste materials.

Construction and Demolition (C&D) debris contains many salvageable items. Once these salvageable components have been removed for reuse or other beneficial purpose, the remain material is renamed "C&D disposal debris." This remaining C&D disposal debris is usually simply abandoned by being disposed of, burned or incinerated. Component separation of C&D debris may be undertaken at the construction or demolition project site, land development site, permitted/licensed or approved Material Recovery Facility (MRF), solid waste transfer station or at any other site location approved by environmental regulatory authorities to accept and process this type of solid waste material. Additionally, certain geographic site specific conditions may be encountered where the economics of removing/separating usable components/items from the C&D debris may not be economically favorable. This occurs when no demand or current market exists for the components/items if removed/separated from the C&D debris. This unseparated C&D debris now also becomes "C&D disposal debris" and is usually abandoned by being disposed of, burned or incinerated. The C&D debris, whether separated or unseparated before processing/ manufacturing, is considered a raw material/feed stock in this related art. It is this C&D disposal debris raw material/ feed stock which is processed by mechanical screening/ shredding to a predetermined specification maximum particle size which produces/creates the manufactured "C&D Recovered Screened Materials (RSM)" product of this related art.

Once treated with the preferred formulated solution of this related art, this C&D-RSM material becomes the MSW disposal landfill substitute daily cover product of this invention. Furthermore, once processed by mechanical screening/ shredding, this MSW disposal landfill substitute daily/initial cover product, both before and after treatment, is referred to as C&D Recovered Screen Material (RSM). "Recovered Screen Materials (RSM)" is the mixture of collected solid particles which have passed through a screen or grate having predetermined size openings in their surface when solid waste is processed by mechanical screening or shredding. The environmental impact as well as public health, safety and welfare issues should be investigated thoroughly by environmental regulatory authorities before giving site specific approval allowing the utilization of this C&D-RSM product for any other use than by solid waste disposal landfills operating with a leachate containment system.

The State of Florida's Administrative Code (F.A.C.) (R. 12/96) Chapter 17-520.400, Ground Water Classes, Standards and Exemptions, addresses protective minimum criteria for ground water, and is included herein.

17-520.400(1)—All ground water shall at all places and at all times be free from domestic, industrial, agricultural, or other man-induced non-thermal components of discharges in concentrations which, alone or in combination with other substances, or components or discharges (whether thermal or non-thermal):

(a) Are harmful to plants, animals or organisms that are native to the soil and responsible for treatment or stabilization of the discharge relied upon by Department permits; or (b) Are carcinogenic, mutagenic, teratogenic, or toxic to human beings, unless specific criteria are established for such components in Rule 62-520.420 F.A.C.; or (c) Are acutely toxic within surface waters affected by the ground water; or (d) Pose a serious danger to the public health, safety or welfare; or (e) Create or constitute a nuisance; or (f) Impair the reasonable and beneficial use of adjacent waters.

The pollution threat to ground water or surface waters from specific contaminants which may leach from the manufactured C&D disposal debris RSM product can be limited by the application/utilization of this substitute daily/initial cover product only at solid waste disposal landfills which operate with a landfill leachate containment system. Furthermore, the C&D-RSM product should be tested for all of the contaminants listed in the Florida Department of Environmental Protection (FDEP) 1994 Groundwater Guidance Concentration Booklet; Bureau of Drinking Water and Groundwater Resources compiled by Bryan Baker, telephone (904) 488-3601, incorporated herein by reference. An example of a potential groundwater contaminant listed in the FDEP 1994 Groundwater Guidance Concentration Booklet as a systemic toxicant are Boron and Borates, American Chemical Society's Chemical Abstract Services (CAS) #7440-42-8. Boron (B), boric acid ($H_3BO3$) and sodium tetraborate decahydrate (Na $2B4O7.10\ H_2O$) are found as components of commercially available gypsum wallboard. Ground water will cause leaching of boron and borates from gypsum wallboard.

Several samples of commercially available gypsum wallboard were tested by the Curcumin Method and contained on the average 4,000 mcg/g (ppm) of total boron and borates. This average value of 4,000 ppm computes to 7.86 pounds of boron and borates per ton (2,000 pounds) of commercially available gypsum wallboard. The guidance concentration listed in the 1994 FDEP Groundwater Guidance Concentration Booklet for boron and borates is 630 ug/L (ppb). Based on this guidance concentration value, 2,000 pounds of commercially available gypsum wallboard, which contains 7.86 pounds of Boron, will cause 1,496,483 gallons of ground water to exceed the listed permissible limit.

Additionally, dissolved solids which migrate from this C&D-RSM product should be evaluated carefully by environmental regulatory authorities to determine their potential overall effect before allowing usage of this material at a location operating without a leachate containment system. An example of this is found in the State of Florida's Administrative Code (F.A.C.) Chapter 62 Part 701 (62-701) Solid Waste Management Facilities, dated Apr. 23, 1997, Section 300 Prohibitions (b) and is included herein.

62.701.300(b) No person shall store, process or dispose of solid waste in a manner or location that causes air quality standards to be violated or water quality standards or criteria of receiving waters to be violated.

The C&D disposal debris which has not been allowed to become commingled or mixed with any other classification of solid waste material may be abandoned by disposal at a permitted/licensed C&D debris landfill or other approved site location including any RSM generated/produced or removed from this debris. However, if the C&D disposal debris has been mixed or commingled with other classifications of solid waste, such as commercial solid waste, it cannot be abandoned by disposal at a permitted/licensed or approved C&D debris landfill including any RSM generated/produced or removed from this debris mixture.

Commercial solid waste as used herein is solid waste originating from stores, businesses, commercial warehouses, hospitals, educational, health care, military and correctional institutes, non profit research organizations, government offices and the like. It typically includes, but is not limited to, waste rubber tires, processed waste rubber tires, rubber items, carpet, mixed paper, plastic, painted lumber, packaging material, textiles, wooden crates, pallets, metal strapping, glass, ferrous and non-ferrous items, furniture, upholstered furniture, small pieces of office equipment, treated lumber, fiberglass, fiberglass items, de minimis amounts of putrescible items, insulation material, styrofoam and the like.

This mixed or commingled C&D disposal debris must be disposed of at a Class III solid waste disposal landfill, Subtitle "D" MSW disposal landfill, Class I MSW disposal landfill, MSW disposal landfill operating within a slurry wall landfill leachate containment system or other environmental regulatory authority approved site location.

Under certain environmental regulatory conditions, the C&D disposal landfill, Solid Waste Transfer Station, Materials Recovery Facility (MRF) or the like which is permitted/licensed or approved to accept and process C&D debris or its equivalent may be located within the geographic site boundaries of a MSW disposal landfill, Class I solid waste disposal landfill, Subtitle "D" Municipal Solid Waste (MSW) disposal landfill, MSW disposal landfill operating within a slurry wall landfill leachate containment system or their equivalents. Additionally, the C&D disposal landfill, Solid Waste Transfer Station, Materials Recovery Facility or the like which is permitted/licensed or approved to accept and process C&D debris may be located directly on top of a previously used sanitary landfill, MSW disposal landfill, Class I solid waste disposal landfill, Subtitle "D" MSW disposal landfill or their equivalents.

It is within the contemplation and scope of the present invention that limited or incidental amounts of other solid waste components may be present in the C&D debris without altering either its essential characteristics or its suitability to be manufactured into the specification particle sized C&D-RSM substitute daily/initial cover product of this related art. The "C&D disposal debris" which has been processed/manufactured into RSM by mechanical screening/shredding is viewed as a "Recyclable Material" in this art and not a solid waste. The definition of "Recyclable Material" is found in the State of Florida Statutes (F.S.) 1996 Supplement to Florida Statutes 1995, Chapter 403 Part IV Resources Recovery and Management, definition (5) "Recyclable Material" included herein:

(5) "Recyclable material" means those materials which are capable of being recycled and which would otherwise be processed or disposal of as a solid waste.

Therefore, C&D disposal debris when manufactured into an accepted and approved specification particle sized MSW disposal landfill or other approved site location substitute daily cover product qualifies as a "recycled material." Furthermore, by viewing this C&D disposal debris as a raw material/feed stock the town, city, municipality, county, state or the like where this debris was generated/produced may be allowed to factor the reuse of this debris into their overall recycling credits. This in turn would increase their recycling credits and thus their ability to qualify for Federal Government grants.

The Federal Governments, Code of Federal Regulations, (CFR)(Jul. 1, 1996 Edition) definition of "Solid Waste" is found at 40-CFR part 261.2 and is incorporated herein by reference.

An excerpt from 40-CFR-261.2, definition of "Solid Waste" is included herein.

40 C.F.R. 261.2

(e) Materials that are not solid waste when recycled.

(1) Materials are not solid wastes when they can be shown to be recycled by being:

(i) used or reused as ingredients in an industrial process to make a product, provided the materials are not being reclaimed; or (ii) Used or reused as effective substitutes for commercial products; or (iii) Returned to the original process from which they are generated, without first being reclaimed or land disposed. The material must be returned as a substitute for feed stock materials. In cases where the original process to which the material is returned is a secondary process, the materials must be managed such that there is no placement on the land.

Therefore, when this C&D-RSM product is applied at MSW disposal landfills or other approved site locations as daily/initial cover material substituting the normally used commercial products of sand, dirt, earthen material or the like and then treated with the formulated solution of this related art, it should no longer be classified as a solid waste by environmental regulatory authorities.

One known solution to converting Construction and Demolition (C&D) debris to a landfill daily cover material is disclosed in U.S. Pat. No. 5,320,450 to Smith, et al. This prior art does not adequately address the criteria found at 40 Code of Federal Regulations (CFR) Jul. 1, 1996 edition, part 25B.21 (a.) "Cover Material Requirements," included herein, which outlines the specific parameters that must be met in order for any product or material to be approved for daily cover usage. The Federal Governments Environmental Protection Agency regulations found at 40 Code of Federal Regulations (CFR), revised as of Jul. 1, 1996, Part 258.21 (Cover Material Requirements) which has been adopted by most states, is included herein.

40CFR-258.21

COVER MATERIAL REQUIREMENTS (a) Except as provided in paragraph (b) of this section, the owners or operators of all MSWLF units must cover disposed solid waste with six inches of earthen material at the end of each operating day, or at more frequent intervals if necessary, to control disease vectors, fires, odors, blowing litter and scavenging.

(b) Alternative materials of an alternative thickness (other than at least six inches of earthen material) may be approved by the director of an approved state if the owner or operator demonstrates that the alternative material and thickness control disease vectors, fires, odors, blowing litter, and scavenging without presenting a threat to human health and the environment.

(c) The director of an approved state may grant a temporary waiver from the requirement of paragraph (a) and (b) of this section if the owner or operator demonstrates that there are extreme seasonal climatic conditions that make meeting such requirements impractical.

Additionally, regional environmental regulatory authorities frequently require that a maximum particle size specification be met before a product or material is approved by them for use as MSW disposal landfill or other approved site location substitute daily/initial cover material.

"Cover Material Requirements" not specifically addressed in the referenced prior art include, but are not limited to control of disease vectors, fires, odors and a specification maximum particle size which can be approved by regional environmental regulatory authorities. Additionally, Smith does not give us a clear description of particle size which is a specific environmental regulatory authority regional requirement necessary for any material or product to be classified as daily cover. Furthermore, in the state of Florida, once the C&D disposal debris is commingled, mixed or included with commercial solid waste as disclosed in the referenced prior art it would lose its classification as C&D disposal debris as outlined in the Florida Administrative Code (F.A.C.), Section 62-701, dated Apr. 23, 1997, definition of Construction and Demolition (C&D) debris. It would be illegal for this resulting mixture of disposal materials to be stored, processed or abandoned by disposal as C&D debris in the state of Florida.

U.S. Pat. No. 5,534,301 to Shutt, et al. discloses that boric acid is a well known fire retardant. Shutt, however, is applying this boric acid fire retardant to a "select" cellulose material which is grade number eight newspaper and not to a manufactured C&D disposal debris RSM landfill daily cover product.

In U.S. Pat. No. 5,605,417 to Englert, et al. discloses that it is well known to add nutrients (nitrogen and phosphorous, etc.) to waste material in landfills. Englert, however, is adding the selected nutrients to waste in landfills and not to a manufactured C&D-RSM substitute daily/initial cover product utilized at a landfill.

U.S. Pat. No. 5,468,291 to Waterson, et al. discloses that Automobile Shredder Residue (ASR) can be utilized as landfill daily cover material. This reference, however, fails to disclose as to how the ASF satisfy the Federal Environmental Protection Agency (F.E.P.A.) specific "Daily Cover Requirements" found at 40-CFR-258.21 which must be fulfilled in its entirety before any product or material can be approved for landfill daily cover usage.

Therefore, in view of the foregoing limitations and shortcomings of the prior art, as well as other disadvantages not specifically mentioned above, it should be apparent that there still exists a need in the art for a method of manufacturing C&D disposal debris into a MSW disposal landfill or other approved site location daily cover product which meets the specifications of daily cover and can be approved for use by environmental regulatory authorities.

It has been discovered that Construction and Demolition (C&D) debris which may be separated or unseparated can be utilized as a raw material/feed stock. This C&D debris feed stock can be mechanically processed by screening or shredding to manufacture a specification particle size "Recovered Screened Material" (RSM). The RSM material than can be treated with a formulated solution qualifying it as an acceptable and approved substitute MSW disposal landfill daily/initial cover product meeting the specific environmental regulatory authority requirements of daily cover material. The treated RSM product then can be utilized as substitute daily/initial cover material at MSW disposal landfills operating with a landfill leachate containment system or other approved site location.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENTS

Figure 1:
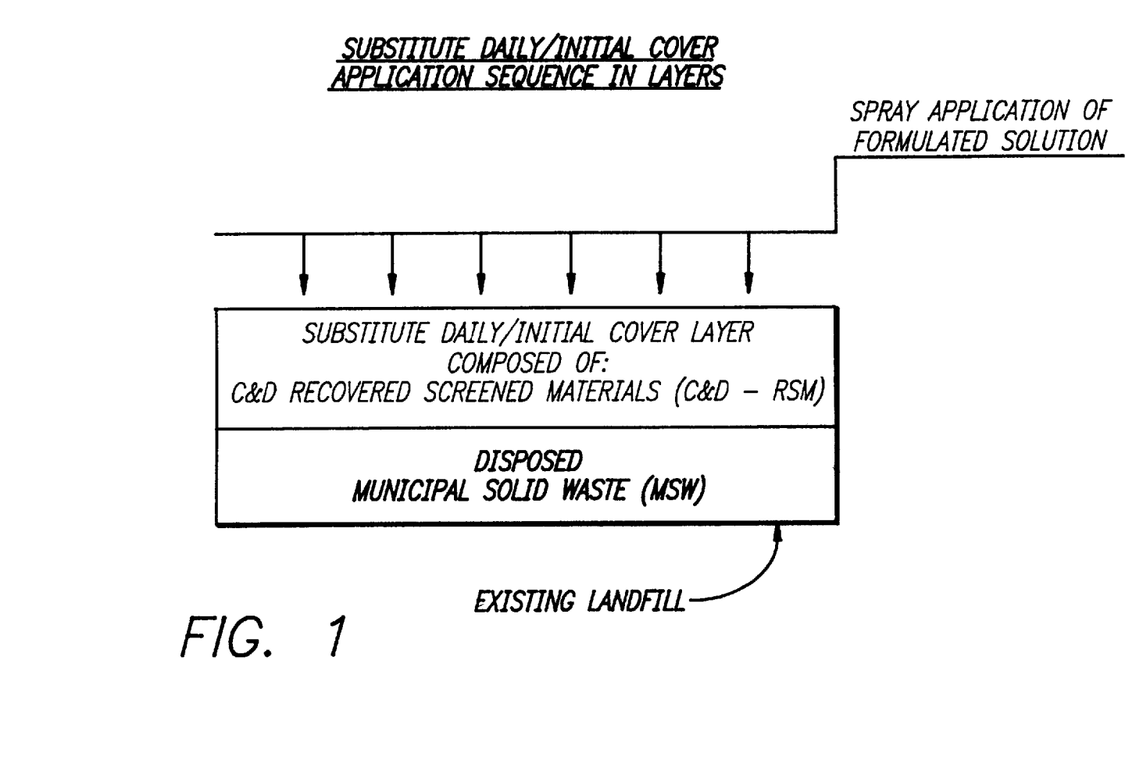
FIG. 1 is a diagrammatic illustration showing the sequence of application of the substitute daily/initial cover material in accordance with the method of the present invention.

The municipal solid waste (MSW) disposal landfill or other approved cite location substitute daily/initial cover product of the present invention is a composite of components/items which are found in and as defined by the State of Florida's Administrative Code (F.A.C.) are known as Construction and Demolition (C&D) debris. Once a determination has been made that no further use for the Construction and Demolition (C&D) debris exists it is renamed Construction and Demolition (C&D) disposal debris. The Construction and Demolition (C&D) disposal debris is utilized specifically as a raw material/feed stock instead of being abandoned by disposal, burning or incineration in this related art.

This raw material/feed stock is mechanically processed by screening/shredding to manufacture a specification sized product which is referred to as "C&D Recovered Screened Materials (C&D-RSM)." Throughout the solid waste industry, this C&D disposal debris raw material/feed stock, which has been processed by mechanical screening/shredding into specification particles three inches or less in size, may also be referred to as:

C&D recovered screen fines;
C&D recovered screened refuse;
C&D recovered screened mixed refuse;
C&D landfill "light" mixed refuse;
C&D landfill "heavy" mixed refuse;
C&D restricted use fill material;
C&D restricted use screened fill material;
C&D mixed refuse screened residue;
C&D mixed recovered screened refuse;
C&D yard trash mulch;
C&D yard trash screened mulch;
C&D mulched materials;
C&D mulched rubbish;
C&D screened/mulched rubbish;
C&D fines;
C&D recovered screened fines;
C&D recovered soil materials; or the like.

All of these differently named products have been mechanically manufactured from the same Construction and Demolition (C&D) disposal debris raw material/feed stock and are collectively known as "C&D Recovered Screened Materials." Regardless of which synonym is used to describe this C&D debris RSM product, it is the origin of the raw material/feed stock from which this product was manufactured which determines its final classification and end use. In order for the manufactured C&D disposal debris RSM product to be approved as MSW disposal landfill or other approved site location substitute daily/initial cover material by environmental regulatory authorities, it must meet certain required specifications.

In particular, the C&D debris RSM product must be composed of particles of material three inches or less in size and possess the ability to control disease vectors, fires, odors, blowing litter and scavenging. At the start of the Recovered Screen Materials (RSM) manufacturing process, the C&D disposal debris is sorted to remove large bulky items which could cause damage to the processing equipment. The remaining C&D disposal debris is broken into manageable pieces by the use of a dozer, solid waste compactor, wheeled loader or the like. Furthermore, based on the consistency and composition of the C&D disposal debris, no pre-sorting may be required. The C&D disposal debris is further processed in a screening trommel unit or other suitable piece of screening equipment equipped with three inch openings in its discharge surface.

Particles of C&D disposal debris passing through the three inch openings in the screen surface become the manufactured specification particle sized recovered screened materials (RSM) product of this related art. Oversized particles of C&D disposal debris from the screening process must be further processed. Additionally, oversized particles of C&D disposal debris may be placed directly back into a C&D disposal landfill or other disposal landfill that is permitted/licensed or approved to accept this type of material without additional processing. The oversized particles from the screening process are processed in a shredder or other suitable piece of size reduction equipment equipped with three inch openings in its discharge grates. Furthermore, the C&D disposal debris may be shredded only without prior sorting or mechanical screening if desired.

The C&D disposal debris which has been shredded to particles of material three inches or less in size serve the same purpose, and are equal to, the C&D disposal debris which has been screened to produce/manufacture the RSM product. The small particle size of the processed/manufactured C&D disposal debris RSM product/material also allows this substitute/alternative MSW disposal landfill daily/initial cover product to effectively fill spaces, voids, cavities and the like encountered in the compacted and leveled MSW disposal material. Furthermore, when field tested, 95% of these particles of material by weight must pass through an American Society of Testing and Materials (ASTM) E-11 specification U.S.A. standard testing sieve having 3.00 inch/75 millimeter openings.

Once successfully processed to particles of material three inches or less in size, this recovered screened material (RSM) product satisfies the environmental regulatory authority requirement of particle size. The specification particle sized RSM is the base (principal ingredient) that once treated with the preferred formulated solution of this related art becomes the MSW disposal landfill approved substitute daily/initial cover product of this invention. The C&D disposal debris may be processed into specification recovered screened materials (RSM) product by screening/shredding at a C&D disposal landfill, Solid Waste Transfer Station, Materials Recovery Facility, Class III solid waste disposal landfill or other site location permitted (licensed) or approved to accept and process this type of material. After processing at these types of facilities, the specification RSM product is then transported to the approved receiving site location where it is to be ultimately applied as daily/initial cover material.

In present day practice, the disposed compacted and leveled MSW material is covered at the end of the business day by spreading a layer of dirt, sand, earthen material or the like over the exposed portion (working face) of the waste material. The dirt, sand or earthen material is utilized as daily/initial cover material. Additionally, native dirt or the like taken from on or near the MSW disposal landfills geographic site boundaries may also be used. Furthermore, because of the large quantities needed and the expense incurred in its excavation and transportation to the MSW disposal landfills working face, the dirt, sand, earthen material or the like are considered commercial products in this related art. The thickness of this cover layer is primarily dependent upon the length of time the leveled and compacted waste material in the MSW disposal landfill is to remain temporarily covered. This cover layer, however, must be at least six inches in thickness to satisfy environmental regulatory agency requirements.

In usual practice, the waste material placed in a Municipal Solid Waste (MSW) disposal landfill is leveled, compacted and then covered with daily/initial cover material for a short period of time, typically overnight. If it is necessary to cover the disposed MSW for a longer period of time, a thicker layer of daily/initial cover material must be applied. The primary problem associated with the use of dirt, sand or earthen material is that large quantities of the cover material are necessary to cover the disposed municipal solid waste. Because dirt, sand or earthen material do not decompose/biodegrade or compress to any great degree, there is a substantial loss of available volume for waste, which is forever occupied by the daily applied layers of dirt, sand, earthen material or the like. This is particularly a problem with MSW disposal landfill that are required to be covered at the end of each day of operation. In this instance, a layer of space six inches in depth across the entire landfill working face is lost everyday to the dirt, sand, earthen material or the like which will forever occupy this space. This loss of available space in the landfill, not to mention the cost of the cover material, results in substantial revenue losses to landfill operators. The manufactured Construction and Demolition (C&D) disposal debris RSM product serves as a substitute specification particle sized material replacing the normally used dirt, sand, earthen or the like daily cover material.

The processed/manufactured C&D disposal debris RSM product makes an excellent choice for use as substitute/alternative MSW disposal landfill daily/initial material, specifically in geographic areas where this material has been recovered/separated and then offered for reuse, recycle and/or other productive purpose, but for which no demand or current market exists. Additionally, the C&D disposal debris RSM product/material can be used for productive purposes in the operation and maintenance of a Subtitle "D" Municipal Solid Waste (MSW) Landfill, Class I Solid Waste Landfill, MSW disposal landfill operating within a slurry wall landfill leachate containment system or their equivalents or any other type of solid waste disposal landfill operating with a leachate collection system. Productive or maintenance benefits include, but are not limited to, erosion control, side slope maintenance and haul road construction material if utilized within the permitted/ licensed or approved landfill disposal cell or site boundaries. The manufactured RSM product may also be utilized as intermediate cover material providing it has been tested with an accepted test method and found to contain enough non-burnable/non-combustible earthen like material to exhibit the ability to control fires.

In accordance with the first embodiment, at the subtitle "D" MSW disposal landfill, Class I solid waste disposal landfill, MSW disposal landfill operating within a slurry wall leachate containment system or other approved site location, the received MSW is compacted and leveled into place at the end of the business day. Next, a layer of manufactured C&D disposal debris RSM product, which is the "actual" substitute/alternative daily cover material layer is mechanically applied/spread on top of the compacted and leveled disposed municipal solid waste until the required six inch thickness is achieved. The C&D-RSM product which is applied over the top portion of the disposed MSW substitutes/replaces the normally used dirt, sand or earthen daily/initial cover material. When applied to a typical 5,000 square foot working face area of a MSW disposal landfill 125–150 tons of C&D-RSM product are applied. Equipment utilized for spreading the C&D disposal debris RSM product can be, for example, a dozer, wheel loader, self-loading and/or unloading pan or the like. The proper concentration of formulated solution is next applied by spray method soaking the applied RSM product layer until it becomes well saturated. It is at this point, when the C&D disposal debris RSM product is soaked with the formulated solution, that it becomes acceptable and approved daily/initial cover material.

When applied to a 5,000 square foot working face area of a MSW disposal landfill, the formulated solution consists of:

| | |
|---|---|
| Water | 1,000 U.S. gallons |
| Boric Acid | 250 pounds 3% |
| Detergent to break surface tension | 14 pounds |
| Water soluble 15-30-15 fertilizer with trace metals | 24 dry weight oz. |
| MISTOLIN ®, deodorant | 56 fl. oz. |

A sample of each individual batch of formulated solution should be retained using accepted sample preservation methodology. This should include a chain of custody log and tamper proof tape across the sample bottles cap. Furthermore, the collected samples should be saved for at least three years so they can be referenced in the event of any problems which may occur at the receiving MSW disposal landfill.

Each ingredient is dissolved in the given quantity of water allowing the contributed chemical values of each constituent to be safely applied by spray method as a formulated solution. Second, the water dampens the recovered screened materials allowing for penetration of the chemical values into the RSM product. Third, the water lessens the combustion potential of the applied RSM product for a limited period of time.

It has been determined through testing using American Society for Testing and Materials (ASTM) test method D 4982-89 (Flammability Potential Screening Analysis of Waste) that the manufactured RSM substitute daily cover product should have a moisture content of at least twenty-five percent for it not to pose an immediate combustion hazard. Preferably, the moisture content of the manufactured C&D disposal debris RSM product should be kept in the range of 25–35% while being stored on site or when it is being made ready for transportation off site to reduce this product's combustion potential and to control fugitive dust emissions. The optimum moisture content can be controlled directly by adding water/moisture to the C&D disposal debris RSM cover product or more preferably by adding water from a source associated with the shredding operation or process site location. Storm water and/or storm water run off which has been collected and stored on site make an excellent choice for a water/moisture source. Additionally, this water may also serve as a coolant and dust suppressant during actual shredding operation.

Treated leachate liquid generated by a permitted/licensed municipal solid waste (MSW) disposal landfill or treated leachate liquid which has been pumped from within a slurry wall leachate containment system surrounding a (MSW) landfill site boundaries which has been tested and determined not to be hazardous may be added to the processed C&D disposal debris RSM product to increase its workability. Treatment and testing of the landfill leachate liquid ensures that employees handling this liquid during its transportation to or at the MSW disposal landfill and its application to the C&D RSM product will not cause them to become exposed to biological active liquid or hazardous compounds.

The boric acid in the formulated solution serves two distinct purposes. First, the boric acid acts as a disinfectant temporarily controlling any potential disease producing micro-organisms which may be contained within the C&D-RSM substitute daily cover product layer. Furthermore, any disease producing organisms which may be present on any de minimis amounts of municipal solid waste which may protrude from the applied daily cover material are also temporarily disinfected. Additionally, any disease producing micro-organisms which may be travelling upwards with vapors and gasses as they migrate through the disposed municipal solid waste and escape to the surface must travel through this treated C&D-RSM daily cover layer and are also temporarily disinfected. Therefore, the potential disease producing micro-organisms are controlled at their source before they can be carried or spread by vectors to humans. This satisfies the environmental regulatory authority daily cover requirement of controlling disease vectors.

Even though adverse field conditions may be encountered such as rain, snow, ice or similar high moisture climate conditions, the formulated solution must still be applied to control potential disease producing micro-organisms and odors. Disease vectors are rodents, flies, mosquitoes, or other animals, including insects, capable of transmitting disease producing organisms to humans. The manufactured C&D disposal debris RSM product contains no source of putrescible material (food) or other items with which to attract rodents, flies, mosquitoes, animals or insects. The boric acid in the formulated solution also acts to temporarily deter insects away from this treated C&D-RSM substitute daily/initial cover layer.

Secondly, the boric acid in the formulated solution acts as a temporary fire retardant coating all of the three inch or less in size particles of C&D-RSM product which it encounters and remains attached to them after the solution dries. This, in turn, reduces the fire potential of any combustible solid particles contained within the C&D-RSM daily/initial cover product. The boric acid in the formulated solution enables the C&D-RSM product to satisfy the environmental regulatory authority requirement of controlling fires. Furthermore, after treatment with the formulated solution of the related art, the substitute RSM daily cover product has the ability to pass the accepted ASTM test method D 4982-89.

American Society for Testing and Materials (ASTM) Method D 4982-89 (Flammability Potential Screening Analysis of Waste), incorporated herein by reference, is a test method used by those in the waste management industries to aid in identifying the flammability potential of waste material.

This ASTM test method has been accepted state wide by the State of Florida's Department of Environmental Protection (FDEP) for testing CON COVER 180®, alternative daily cover material, manufactured by New Waste Concepts, Inc., Perrysburg, Ohio 43551, which is a mixture of inert and fibrous, cellulose based materials. Another method used to determine the suitability of recovered screened materials (RSM's) ability to control fires is a physical test which determines by weight the percentage of burnable/combustible material to inert earthen like material. This test method, accepted by the State of Florida's Department of Environmental Protection (FDEP) for determining the percentage of burnable/combustible material to inert earthen like material was utilized extensively at the Collier County, Florida Landfill Reclamation Project located at:

Collier County Recycling and Disposal Facility
P.O. Box 990400
3750 Landfill Road
Naples, Fla. 33999-6060-400
Telephone: (941) 455-8062
Laboratory analysis performed by:
Law Engineering, Inc.
3627 Progress Avenue
Naples, Fla. 34104
Phone: (813) 643-4747
This physical test method consists of the following:
Equipment:
Sieve #10 (with 2.00 mm mesh)
Procedure:
Place approximately ½ liter of dry material into the sieve. Cover both top and bottom of the sieve and shake vigorously to separate the contents. Place any large rocks, glass or other non-burnable material into the sieve bottom with the dirt and sand. Separate the burnables such as wood, plastic and paper from any plaster board that may be present. Determine the percentage, by weight, of each category. Report the results as a percentage, by weight, of each category (i.e. soil, burnable combustibles, and plasterboard/gypsum wallboard) to the total weight of the dry material test sample. Specifically, the results should be expressed as an approximate percentage of soil, an approximate percentage of plasterboard, and an approximate percentage of wood, plastic and paper found in the dry material.

Recovered screened materials tested by this approved method and found to contain a minimum of fifty percent non-burnable/non-combustible inert earthen like material was given site specific approval for use as substitute daily/initial cover material at the Collier County Landfill. However, this test method only gives the ratio of burnable/combustible solids to inert and does not address how the combustible solids contained within the RSM are to meet the environmental regulatory authority "daily cover requirement" of controlling fires. It has been found, however, that equations on the percentage of burnable/combustible material contained within the C&D disposal debris RSM product before it is approved for use as MSW disposal landfill or other type of solid waste disposal landfill substitute daily/initial cover material are not an adopted rule but a written policy by the individual FDEP districts regarding the specific solid waste disposal landfill's geographic site location.

The present invention contemplates the use of other fire retardants for application to the C&D disposal debris RSM daily/initial cover product. Various fire retardants when applied to the C&D disposal debris RSM substitute daily cover product layer include the following:

Boric Fire Retardants
Boric Acid
Borax (Sodium Borate)
Boron Oxides
Borates
Borate Esters

Bromine Fire Retardants
Sodium Bromide
Calcium Bromide
Zinc Bromide

Copper Fire Retardants
Copper Sulfates
Copper Oxides
Copper Silicates
Copper Phosphates

Urea Fire Retardants
Urea
Urea Salts
Urea Guanyl Phosphate

Miscellaneous Fire Retardants
Salts of Antimony
Salts of Arsenic (V)
Salts of Calcium
Salts of Chromium III
Salts of Ammonium
Sulfate of Zinc
Sublimed Sal Ammoniac
Silicate of Soda
Alum
Phosphates
Calcium Sulfate
Alumina Trihydrate
Aluminum Sulfate
Phosphate of Ammonia
Sulfate of Ammonia In the event that the application of the temporary fire retardant solution is omitted, the burnable/combustible portion of the manufactured C&D disposal debris RSM product will pose a fire hazard even if the earthen portion of this product exceeds fifty percent. Additionally, without the application of a temporary fire retardant, it is questionable as to how this manufactured RSM product can meet the "Cover Material Requirements" of 40 CFR 258.21 one of which is to control fires. This in turn exposes the MSW disposal landfills or other solid waste disposal landfill operators using this untreated RSM substitute initial/daily cover product to possible lawsuits and fines for environmental damage from environmental regulatory authorities in the event of a landfill fire at their specific site location. Furthermore, in the event that environmental regulatory authorities/agencies permit or approve the use of this manufactured C&D disposal debris RSM product which has not been treated with the formulated solution of this invention to be used as solid waste disposal landfill daily/initial cover material it creates a condition of accountability by them to environmental "watch dog groups" or private citizens in the event of a landfill fire at a solid waste disposal facility which has been approved to use this untreated landfill cover product.

The MISTOLIN® in the formulated solution manufactured by Mistolin Caribe, Inc. Luchetti Industrial Park Bayamon P.R. 00960 makes an excellent choice for an odor controlling agent. The MISTOLIN® enables the formulated solution to satisfy the environmental regulatory authority "daily cover requirement" of controlling odors.

The detergent in the formulated solution breaks the surface tension of the water allowing the chemical values of this prepared mixture to evenly coat all of the particles of the manufactured C&D RSM substitute daily cover product. The detergent should be non-foaming biodegradable, contain no bleach or fragrance and be compatible with boric acid and the present nutrients.

After serving its purpose of covering the disposed municipal solid waste for the required one day time period this completed daily/initial cover layer of treated C&D disposal debris RSM product is buried under garbage, putrescible household waste, rubbish or the like on the next day of landfill operation.

The decomposition/biodegradation of the buried C&D disposal debris RSM daily/initial cover product layer proceeds by utilizing the natural occurring microbes available from the disposed municipal solid waste which trickle down to this treated region.

The water soluble nutrients/fertilizer in the formulated solution serve to create the proper growth environment for the available naturally occurring microbes from the disposed municipal solid waste. Natural microbes available from the disposed municipal solid waste material include aerobic, anaerobic and facultative bacteria plus most types of fungi. Fungi includes phycomycetes, asocymcetes, basidiomycetes and fungi imperfecti. Common soil bacterial include rhizobium, azotobacter, basidiomycetes and other species.

Depending upon field conditions such as rain, snow, etc., a granular dry fertilizer mixture may be substituted for the water soluble nutrient/fertilizer. The granular dry fertilizer mixture can be applied by using a rotary fertilizer spreader or its equivalent. Biosolid fertilizer (domestic sewage sludge) material as regulated by the Federal Environmental Protection Agency (FEPA) under Code of Federal Regulations (CFR) Part 503, Standards for the Use or Disposal of Sewage Sludge and/or its equivalent may also be used.

Class A (Grade I) domestic waste water residuals (sludge), Class B (Grade II) domestic waste water residuals (sludge) when utilized as biosolid fertilizer material and regulated by the State of Florida's Administrative Code (F.A.C.) Chapters 62-640 and/or its equivalent can be used also. Additionally, a controlled time release fertilizer can be used. The actual fertilizer materials to attain optimal levels of the primary nutrients Nitrogen, Phosphorous and Potassium (NPK) can be but are not limited to, nitrogen (amines, nitrates, ammonia salts and the like), phosphorous-phosphates (calcium, super phosphate, ammonium phosphate and the like), potassium (potassium sulfate, potassium nitrate, potassium carbonate and the like). Additionally, secondary nutrients (trace elements) such as boron, copper, iron, manganese, molybdem, zinc and the like should be also added. Adjustments to the levels of primary nutrients, secondary nutrients (trace metals) as well as the pH levels are made as often as required to maintain optimal nutrient conditions for rapid biodegradation/decomposition of the applied C&D-RSM daily/initial product layer. Caution should be exercised in applying the nutrient mixtures to the disposed municipal solid waste (MSW) material. Concentrated nutrient application may accelerate excessive biodegradation, resulting in spontaneous combustion of the "covered" MSW disposal material. Furthermore, depending upon the amount of biodegradable organic material contained within the solid waste disposal material received at the MSW disposal landfill, the addition of nutrients (fertilizer) may not be required. All of these elements combine to create a manufactured product with known specification which satisfy known requirements. Additionally, this product is reproduced in such a way that a guarantee can be issued.

Due to its small particle size and uniform consistency, the manufactured C&D disposal debris RSM daily/initial cover product is an excellent material for controlling blowing litter.

Scavenging, as applied to solid waste disposal landfills, is a phenomenon where humans which are drivers or occupants of vehicles arriving at the landfill for the purpose of disposing of their loads of waste material leave their vehicles and remove items which they deem useful from other loads of disposed waste material. This undesirable and dangerous activity is controlled by posting signs at the entrance to the solid waste disposal facility stating that all scavenging activities are prohibited.

Lumber, wood, vegetative matter, tree mains, organic soils, solid organic material and the like comprise a large portion of the manufactured C&D disposal debris RSM substitute daily/initial cover product. Microbes, fungi, bacteria and the like aided by moisture and nutrients from the applied formulated solution accelerate the biodegradation/decomposition process. As these components/items biodegrade/decompose, it results in substantial space savings and added revenue to the landfill operation by increasing waste volume availability, therefore, extending the useful life of a MSW disposal landfill or other environmental regulatory agency approved solid waste disposal landfill utilizing this RSM daily cover product.

Additional benefits can be obtained by the use of a leachate recirculation system on the Subtitle "D" municipal solid waste (MSW) disposal landfill, Class I MSW disposal landfill, MSW disposal landfill operating within a slurry wall landfill leachate containment system or any solid waste disposal landfill where daily/initial cover material is required by environmental regulatory agency rule. When the solid waste landfill leachate is recirculated, the constituents of the leachate are diluted by biological activity and by other chemical and physical reactions occurring within the landfill thereby increasing the decomposition/biodegradation process.

Testing of this manufactured C&D disposal debris RSM product cannot guarantee that some portion of this product will not cause a public health, environmental ground water or surface waters problem if released for general use outside of the permitted/licensed or approved applications site boundaries.

In a second embodiment of the present invention, C&D recovered screened materials (C&D-RSM) is combined with Class III/commercial recovered screened materials (Class III-RSM) to create a blended, manufactured, specification municipal solid waste disposal landfill or other approved solid waste disposal landfill substitute/alternative daily/initial cover product. Class III solid waste material is synonymous with commercial solid waste material. Specifically excluded from Class III/commercial solid waste is biological/biomedical waste, hazardous waste materials and all putrescible items.

The definition of Class III landfills and a description of a portion of the type of solid waste which they are permitted/licensed or approved to accept for disposal is found in the Florida Administrative Code (F.A.C.) Chapter 62-701, Solid Waste Management Facilities dated Apr. 23, 1997, Section 340, General Criteria for Landfills (3)(d) included in part herein.

(3)(d) Class III landfills are those which receive only yard trash, construction and demolition debris, waste tires, asbestos, carpet, cardboard, paper, glass, plastic, furniture, other than appliances, or other materials approved by the Department which are not expected to produce leachate which poses a threat to public health or the environment. Class III landfills shall not accept putrescible household waste.

Commercial solid waste as used herein is solid waste originating from stores, businesses, commercial warehouses, hospitals, educational, health care, military and correctional institutions, non-profit research organizations and government offices and the like. It typically includes, but is not limited to, waste rubber tires, processed waste rubber tires, rubber items, carpet, mixed paper, plastic, painted lumber, packaging material, textiles, wooden crates, pallets, metal strapping, glass, ferrous and non-ferrous items, furniture, upholstered furniture, small pieces of office equipment, treated lumber, fiberglass items, de minimis amounts of putrescible items insulation material, styrofoam and the like.

Industries typically generate/produce a large portion of solid waste which because of the components/items from which it is comprised, can be classified as Class III/ commercial solid waste. It is only this Class III/commercial solid waste portion of the solid waste stream generated/ produced by the following Standard Industrial Classification (S.I.C.) Industry Divisions which is utilized in this embodiment. Division A: Agriculture, forestry and fishing; Division B: Mining; Division D: Manufacturing; Division E: Transportation, communications, electric, gas and sanitary services; Division F: Wholesale trade; Division G: Retail trade; Division H: Finance, insurance and real estate; Division I: Services; Division J: Public administration; Division K: Non-classifiable establishments.

The Class III solid waste is utilized as a raw material/feed stock in this embodiment and comes from a Class III disposal landfill, Materials Recovery Facility (MRF) which is permitted/licensed to accept and process Class III disposal material or any site location permitted or approved to accept and process this type of disposal material. Under certain environmental regulatory conditions, the Class III disposal landfill or the Material Recovery Facility (MRF) which is permitted/licensed or approved to accept and process Class III disposal material or its equivalent may be located within the site boundaries of a MSW disposal landfill, Subtitle "D" MSW disposal landfill, Class I solid waste disposal landfill, MSW disposal landfill operating within a slurry wall landfill leachate containment system or their equivalents.

Furthermore, the Class III disposal landfill or the Material Recovery Facility (MRF) which is permitted/licensed to accept and process Class III disposal material may be located directly on top of a previously used MSW disposal landfill, Subtitle "D" MSW disposal landfill, Class I solid waste disposal landfill, MSW disposal landfill operating within a slurry wall landfill leachate containment system or their equivalents.

At the start of the manufacturing process, the Class III raw material/feed stock is sorted to remove large bulky items which may damage the process equipment. The remaining material is broken into manageable pieces by the use of a dozer, solid waste compactor or the like. The Class III raw material/feed stock is further processed in a screening trommel unit or other suitable piece of screening equipment with three inch openings in its screen surface. Particles of Class III solid waste passing through the three inch openings in the screen surface produce a Class III Recovered Screened Materials (Class III-RSM) product suitable for combining with the manufactured C&D disposal debris RSM product. Oversized particles of Class III solid waste from the screening process must be further processed before reuse.

Additionally, oversized particles of Class III disposal material may be placed directly back into a Class III disposal landfill or other disposal landfill that is permitted/licensed or approved to accept this material without further processing. The Class III disposal material may be shredded only without prior sorting or mechanical screening if desired. The oversized particles from the screening process are processed in a shredder or other suitable piece of size reduction equipment equipped with three inch openings in its discharge grates.

After screening/shredding, the Class III/commercial solid waste RSM product undergoes a magnetic separation process to remove all ferrous items from the finished manufactured product. Additionally, the Class III RSM product may undergo processing by an eddy current separation unit which removes all the remaining non-ferrous metal. The Class III solid waste which has been shredded to particles of material three inches or less in size serve the same purpose, and is equal to, the Class III solid waste which has been screened to produce the Class III "recovered screened material" (Class III-RSM) product of this embodiment. Processing to particles of material three inches or less in size enables the manufactured Class III/commercial solid waste portion of this blended substitute daily/initial cover product to satisfy the environmental regulatory authority requirement of specification particle size.

Throughout the solid waste industry, this Class III/ commercial solid waste raw material/feed stock which has been processed by mechanical screening/shredding into specification particles of material three inches or less in size may also be referred to as:

Class III/commercial recovered screened materials;
Class III recovered screened refuse;
Class III recovered screened mixed refuse;
Class III landfill "light" mixed refuse;
Class III landfill "heavy" mixed refuse;
Class III restricted use fill material;
Class III mixed refuse rejects;
Class III mixed refuse residue;
Class III mixed recovered screened refuse;
Class III trash mulch;
Class III mulch;
Class III recovered soil materials;
Class III debris mulch or the like.

All of these differently named products have been mechanically manufactured from the same Class III/ commercial solid waste raw material/feed stock and are collectively known as "Class III Recovered Screened Materials" (RSM). Regardless of which synonym is used to describe this Class III/commercial solid waste RSM product, it is the origin of the raw material/feed stock from which this product was manufactured which determines its final classification and end use. Combining/mixing of the manufactured Class III RSM product with the manufactured C&D-RSM product is accomplished at the receiving Subtitle "D" MSW disposal landfill, Class I solid waste disposal landfill or at any site location permitted/licensed or approved to accept this classification of solid waste material.

Once combined/mixed, these two RSM products create the blended municipal solid waste disposal landfill or other approved site location substitute daily/initial cover product/ material of this related art. Furthermore, the manufactured Class III RSM product may be utilized as daily/initial cover material without combining/mixing with the C&D debris RSM product if desired. Combining is accomplished with any piece of suitable mixing or blending equipment until the desired conditions for application of this manufactured MSW disposal landfill approved, substitute daily/initial cover product are achieved. Water associated with the receiving MSW disposal landfill operation such as landfill leachate water and/or landfill storm water which has been collected, stored, treated, tested and found acceptable may be added to this blended mixture of materials to increase its workability and biodegradability.

This combined product is then applied as substitute daily/ initial cover material over disposed municipal solid waste which has been compacted and leveled into place at a Subtitle "D" municipal solid waste disposal landfill, Class I solid waste disposal landfill, MSW disposal landfill operating, within a landfill leachate slurry wall leachate containment system or other approved site location. The combined daily/initial cover product consisting of processed Class III RSM and C&D RSM substitutes the normally used sand, dirt or earthen daily cover material.

In a preferred process method of this second embodiment, the construction and demolition disposal debris raw material/feed stock is delivered to the manufacturing site. The Class III/commercial solid waste raw material/feed stock is delivered to the same manufacturing site. At the permitted/licensed or approved manufacturing/processing site, both of these raw material/feed stocks are fed simultaneously into a shredder equipped with three inch openings in its discharge grates. The resulting commingled inseparable mixture of shredder output materials is the manufactured C&D-Class III recovered screened materials substitute daily cover product of this related embodiment. After application of this substitute daily/cover product over disposed municipal solid waste, it is treated by spray method with the formulated solution until the desired conditions are achieved. This treatment enables this applied product to satisfy the specific environmental regulatory authority "Daily Cover Requirements" and qualify as an approved substitute daily/initial cover material. This completed substitute daily/initial cover product layer of combined Class III and C&D debris RSM products are buried under municipal solid waste material, i.e., garbage, putrescible household waste, refuse, rubbish or the like on the next day of landfill operation. As this completed cover material layer decomposes/biodegrades, valuable landfill disposal space is regained.

In a third embodiment of the present invention, automobile shredder residue recovered screened materials (ASR-RSM) product is combined with construction and demolition debris recovered screened materials (C&D-RSM) product to create a blended, manufactured, specification municipal solid waste disposal landfill substitute/alternative daily/initial cover product.

At the start of the shredding process, automobiles, appliances, and other metal objects are fed to a hammermill which shreds them to fist-sized pieces known as metal shredder output. Powerful magnets then separate from this shredder output the ferrous (iron containing) metal fragments, which are the primary product of the metal shredding process, from the non-ferrous metal fragments. This separated ferrous metal portion is reused as a raw material/feed stock to manufacture new ferrous metal products.

The environmental regulatory authorities definition of "by-product" is found at 40 Code of Federal Regulations (C.F.R.) part 261, Jul. 1, 1996 Edition Identification and Listing of Hazardous Waste, Subpart A-General, 261.1 Purpose and Scope (3) included herein.

3) A "by-product" is a material that is not one of the primary products of a production process and is not solely or separately produced by the production process.

Examples are process residues such as slag or distillation column bottoms. The term does not include a co-product that is produced for the general public's use and is ordinarily used in the form it is produced by the process.

The remaining metal shredder by-product/residue is further processed by eddy current separators which remove the non-magnetic metal fragments from the shredder output. This non-magnetic second metal by-product is reused as a raw material/feed stock in various industrial processes to manufacture new non-magnetic metal products. After the eddy current metal separation has been completed, the remaining by-product/residue is known as Automobile Shredder Residue (ASR) and additionally, is often referred to as fluff.

Automobile Shredder Residue (ASR) is the predominantly non-metallic solid material including without limitation, plastic, broken glass, rubber, foam rubber, road dirt and fabric resulting from the shredding of ferrous metals, such as, but not limited to, scrap automobiles and appliances. This automobile shredder by-product/residue is delivered from the shredder to a Subtitle "D" MSW disposal landfill, Class I solid waste disposal landfill, materials recovery facility (MRF) Transfer Station or other permitted/licensed or approved site location. The automobile shredder by-product/residue is further processed in a screening trommel unit or other piece of screening equipment equipped with three inch openings in its screen surface.

Particles of ASR passing through the three inch openings in the screen surface create an Automobile Shredder Residue Recovered Screened Materials (ASR-RSM) product. The oversized particles from the screening processes are processed in a shredder or other suitable piece of size reduction equipment equipped with three inch openings in its discharge grates. The ASR which has been shredded to particles of material three inches or less in size serve the same purpose and are equal to, the ASR which has been screened to produce the automobile shredder residue recovered screened materials (ASR-RSM) product of this embodiment.

Combining/mixing of the manufactured ASR-RSM product with the manufactured C&D-RSM product is accomplished at the receiving Subtitle "D" MSW disposal landfill, Class I solid waste disposal landfill, or at any site location permitted/licensed or approved to accept this classification of solid waste material. Once combined/mixed, these two RSM products create the blended municipal solid waste disposal landfill or other approved site location substitute daily/initial cover product of this third embodiment. Combining is accomplished with any piece of suitable mixing or blending equipment until the desired conditions for application of this manufactured MSW disposal landfill approved, substitute daily initial cover product are achieved. Additionally, automobile shredder residue which has been accepted for disposal at a Construction and Demolition (C&D) debris landfill, Class III disposal landfill or their equivalents before environmental regulatory authority rule changes prohibiting disposal of this material at these two classifications of landfill can be excavated and processed into substitute daily cover product using the preferred method of this embodiment. Furthermore, "misbehavior" may be discovered by environmental regulatory authorities concerning unauthorized ASR which has been accepted for disposal by C&D debris landfills or Class III disposal landfills. Once misbehavior has been discovered, corrective action is taken to remove the unauthorized ASR.

The unauthorized ASR and any disposal material with which it has become commingled with and is inseparable from can be excavated/remined and processed into substitute daily cover product using the preferred method of this embodiment. This combined product is then applied as substitute daily/initial cover material over disposed municipal solid waste which has been compacted and leveled into place at a Subtitle "D" municipal solid waste disposal landfill, Class I solid waste disposal landfill, MSW disposal landfill operating within a landfill leachate slurry wall leachate containment system or other approved site location. This combined daily/initial cover product substitutes the normally used sand, dirt or earthen daily cover material.

In a preferred process method of this third embodiment, the automobile shredder residue (ASR) raw material/feed stock is delivered to the manufacturing site. The construction and demolition disposal debris raw material/feed stock is also delivered to the same manufacturing site. At the permitted/licensed or approved manufacturing/processing site, both of these raw material/feed stocks are fed simultaneously into a shredder equipped with three inch openings in its discharge grates. In this particular preferred process method, the ASR is reshredded. The resulting commingled inseparable mixture of shredder output materials is the manufactured C&D-ASR recovered screened materials substitute daily cover product of this related embodiment.

After application of this substitute daily/cover product over disposed municipal solid waste, it is treated by spray method with the formulated solution until the desired conditions are achieved. This treatment enables this applied product to satisfy the specific environmental regulatory authority "Daily Cover Requirements" and qualify as an approved substitute daily/initial cover material. This completed substitute daily/initial cover product layer of combined automobile shredder residue and C&D debris RSM products are buried under municipal solid waste material, i.e., garbage, putrescible household waste, refuse, rubbish or the like on the next day of landfill operation. As this completed cover material layer decomposes/biodegrades, valuable landfill disposal space is regained.

In a fourth embodiment of the present invention, municipal solid waste recovered screened materials (MSW-RSM) product is combined with construction and demolition recovered screened materials (C&D-RSM) product to create a blended, manufactured, specification municipal solid waste disposal landfill substitute/alternative daily/initial cover product. Municipal solid waste (MSW) is synonymous with garbage and/or refuse. "Municipal" means a town, city, etc. which has a local governing body.

"Solid waste" is garbage, refuse, sludge and other discarded solid materials including those from industrial, commercial and agricultural operations, and from community activities; does not include solids or dissolved materials in domestic sewage or other significant pollutants in water resources, such as silt, dissolved or suspended solids in industrial waste water effluents, dissolved materials in irrigation return flows or other common pollutants; any non-liquid, non-gaseous waste.

"Municipal solid waste (MSW)" includes all the wastes generated from residential households and apartment buildings, commercial business establishments, institutional facilities, construction and demolition activities, manufacturing businesses, municipal services and treatment plant sites which are collected for disposal within a town, city, county or the like.

"Garbage" is solid waste consisting of putrescible animal and vegetable waste materials resulting from the handling, preparation, cooking and consumption of food, including waste materials from markets, storage facilities, handling and sale of produce and other food products.

"Refuse" is all solid waste materials which are discarded as useless. A term often used interchangeably with the term solid waste.

Specifically excluded from municipal solid waste is biological/biomedical waste and all hazardous waste materials. The municipal solid waste (MSW) is utilized as a raw material/feed stock in this embodiment. Additionally, the MSW should be classified as a human habitation by-product rather than a municipal solid waste because it is not being disposed of by being abandoned, burned or incinerated but manufactured into an approved substitute landfill daily cover product.

The MSW raw material/feed stock is delivered to the Subtitle "D" MSW disposal landfill, Class I solid waste disposal landfill, MSW disposal landfill operating within a slurry wall landfill leachate containment system, transfer station permitted/licensed or approved to accept this classification of solid waste material or the like for manufacturing. At the start of the manufacturing process, the MSW raw material/feed stock is sorted to remove any bulky items which may damage the processing equipment. The MSW raw material/feed stock is further processed in a screening trommel unit or the like equipped with three inch openings in its screen surface. Particles of municipal solid waste passing through the three inch openings in the screen surface produce a MSW Recovered Screened Materials (MSW-RSM) product suitable for combining/mixing with the construction and demolition disposal debris recovered screened material (C&D-RSM) product of this related art. Oversized particles of municipal solid waste from the screening process must be further processed before reuse. Additionally, the municipal solid waste may be shredded only without prior sorting or mechanical screening if desired. The oversized particles from the screening process are processed in a shredder or other suitable piece of size reduction equipment equipped with three inch openings in its discharge grates.

After screening/shredding, the municipal solid waste RSM product undergoes a magnetic separation process to remove all ferrous items from the finished product. Additionally, the municipal solid waste RSM product may undergo processing by an eddy current separation unit to remove all remaining non-ferrous metal. The MSW which has been shredded to particles of material three inches or less in size serve the same purpose and is equal to the MSW which has been screened to produce the MSW recovered screened materials (MSW-RSM) product of this embodiment. Processing to particles of material three inches or less in size enables the manufactured MSW portion of this substitute daily/initial cover product to satisfy the environmental regulatory authority requirement of specification particle size.

Throughout the solid waste industry, this municipal solid waste raw material/feed stock which has been processed by mechanical screening/shredding into specification particles of material three inches or less in size may also be referred to as:

MSW recovered screened materials;
MSW recovered screened refuse;
MSW recovered screened mixed refuse;
MSW "light" mixed refuse;
MSW "heavy" mixed refuse;
MSW recovered soil material;
MSW restricted use fill material;
MSW mixed refuse rejects;
MSW mixed refuse residue;
MSW mixed recovered screened refuse;
MSW trash mulch;
MSW shredded trash mulch;
MSW shredded debris mulch or the like.

All of these differently named products have been mechanically manufactured from the same MSW raw material/feed stock and are collectively known as "MSW Recovered Screened Materials (MSW-RSM)."

Regardless of which synonym is used to describe this municipal solid waste RSM product, it is the origin of the raw material/feed stock from which this product was manufactured which determines its final classification and end use.

Combining/mixing of the manufactured MSW-RSM product with the manufactured C&D-RSM product is accomplished at the receiving Subtitle "D" MSW disposal landfill, Class I solid waste disposal landfill or at any site location permitted/licensed or approved to accept this classification of solid waste material. Once combined/mixed, these two RSM products create the blended municipal solid waste disposal landfill or other approved site location substitute daily/initial cover product/material of this fourth embodiment. Furthermore, the manufactured municipal solid waste RSM product may be utilized as daily/initial cover material without combining/mixing with the construction and demolition debris RSM product. Combining is accomplished with any piece of suitable mixing or blending equipment until the desired conditions for application of this manufactured MSW disposal landfill daily/initial cover product are reached.

Water associated with the receiving MSW disposal landfill operation such as landfill leachate water and/or landfill storm water which has been collected, stored, treated, tested and found acceptable may be added to this blended mixture of materials to increase its workability and biodegradability.

In a preferred process method of this fourth embodiment, the municipal solid waste raw material/feed stock is delivered to the manufacturing site. The construction and demolition disposal debris raw material/feed stock is delivered to the same manufacturing site. At the permitted/licensed or approved manufacturing/processing site, both of these raw material/feed stocks are fed simultaneously into a shredder equipped with three inch openings in its discharge grates. The resulting commingled inseparable mixture of shredder output materials is the manufactured C&D-MSW recovered screened materials substitute daily cover product of this related embodiment.

This combined product is then applied as substitute daily/initial cover material over disposed municipal solid waste which has been compacted and leveled into place at a Subtitle "D" municipal solid waste disposal landfill, Class I solid waste disposal landfill, MSW disposal landfill operating within a landfill leachate slurry wall leachate containment system or other approved site location. The combined daily/initial cover product consisting of processed municipal solid waste and processed construction and demolition disposal debris RSM products substitutes the normally used sand, dirt or earthen daily cover material.

After application of this substitute daily/initial product over disposed municipal solid waste, it is treated by spray method with the formulated solution until the desired conditions are achieved. This treatment enables this applied product to satisfy the specific environmental regulatory authority "Daily Cover Requirements" and qualify as an approved substitute daily/initial cover material. This completed substitute daily/initial cover product layer of combined municipal solid waste RSM and construction and demolition disposal debris RSM product are buried under municipal solid waste, i.e., garbage, putrescible household waste, refuse or the like on the next day of landfill operation. As this completed cover material layer decomposes/biodegrades, valuable landfill disposal space is regained thus extending the useful life of a solid waste disposal landfill utilizing this substitute daily/initial cover product.

What is claimed is:

1. A method of extending a useful life of a solid waste disposal landfill comprising the steps of:
   providing a raw material feed stock composed of a commingled inseparable mixture of solid waste components;
   recovering a screened material product from said raw material feed stock for use as a substitute daily/initial solid waste disposal landfill cover material;
   periodically leveling and compacting disposed waste material in the solid waste disposal landfill;
   applying a layer of said recovered screened material product to the leveled and compacted disposed waste material; and
   spraying and soaking said layer of recovered screened material product with a solution to inhibit combustion and to promote decomposition consisting of:
   water;
   boric acid;
   detergent;
   a nutrient; and
   a deodorant.

2. A method as recited in claim 1 wherein said step of recovering comprises:
   shredding by impacting, milling or grinding said raw material feed stock through 3" openings of a shredder grate surface so that said recovered screened material product consists of particles having a particle size of 3" or less.

3. A method as recited in claim 1 wherein said step of recovering comprises:
   screening said raw material feed stock through 3" openings of a screen surface so that said recovered screened material product consists of particles having a particle size of 3" or less.

4. A method as recited in claim 3 wherein said raw material feed stock is construction and demolition disposal debris.

5. A method as recited in claim 3 wherein said step of spraying and soaking includes soaking said applied layer with said solution until said layer has a moisture content of at least 25%.

6. A method of extending a useful life of a solid waste disposal landfill comprising the steps of:
   providing a raw material feed stock composed of a commingled mixture of solid waste components;
   recovering a screened material product from said raw material feed stock for use as a substitute daily/initial solid waste disposal landfill cover material;
   periodically leveling and compacting disposal waste material in the solid waste disposal landfill;
   applying a layer of said recovered screened material product to the leveled and compacted waste material; and
   spraying and soaking said layer of recovered screened material product with a solution to inhibit combustion and to provide a nutrient to promote decomposition.

7. A method as recited in claim 6 wherein said step of recovering includes:
   shredding by impacting, milling or grinding said raw material feed stock through 3" openings of a shedder grate surface so that said recovered screened material product consists of particles having a particle size of 3" or less.

8. A method as recited in claim 7 wherein said step of recovering comprises:
   screening said raw material feed stock through 3" openings of a screen surface so that said recovered screened material product consists of particles having a particle size of 3" or less.

9. A method as recited in claim 8 wherein said raw material feed stock is construction and demolition disposal debris.

10. A method as recited in claim 8 wherein said step of spraying and soaking includes soaking said applied layer with said solution until said layer has a moisture content of at least 25%.

11. A method as recited in claim 10 wherein said recovered screen material product is sprayed and soaked with said solution and stored prior to said step of applying said layer wherein said stored recovered screen material is available for subsequent use as said substitute daily/initial solid waste disposal landfill cover material.

12. A method as recited in claim 11 wherein said recovered screen material product is sprayed and soaked with said solution prior to and during storing thereof to achieve a moisture content of at least 25%.

13. A method of extending a useful life of a solid waste disposal landfill comprising the steps of:
   providing construction and demolition disposal debris;
   processing said construction and demolition disposal debris by separating and recovering a construction and demolition disposal debris recovered screened material product therefrom for use as a substitute daily/initial solid waste disposal landfill cover material, said construction and demolition disposal debris recovered screened material product consisting of particles of which at least 90% have a particle size of 3" or less, wherein said step of processing is selected from the group consisting of:
     (a) shredding by impacting, milling or grinding said construction and demolition disposal debris through 3" openings of a shredder grate surface; and
     (b) screening said construction and demolition disposal debris through 3" openings of a screen surface;
   periodically leveling and compacting disposed waste material in the solid waste disposal landfill;
   applying a layer of said construction and demolition disposal debris recovered screened material product to the leveled and compacted disposed waste material; and
   spraying and soaking said layer of construction and demolition disposal debris recovered screened material product with a solution consisting of:
     water;
     boric acid;
     detergent;
     a nutrient; and
     a deodorant.

14. A method as recited in claim 4 wherein said recovered screened material product is construction and demolition disposal debris recovered screened material product.

15. A method as recited in claim 14 further including the step of:
   combining said construction and demolition disposal debris recovered screened material product with Class III/commercial recovered screened material product to create a blended material defining said substitute daily/initial solid waste disposal landfill cover material.

16. A method as recited in claim 14 further including the step:
   combining said construction and demolition disposal debris recovered screened material product with automobile shredder residue recovered screened material to create a blended product defining said substitute daily/initial solid waste disposal landfill cover material.

17. A method as recited in claim 5 further comprising the steps of:
   spraying and soaking said recovered screened material product with said solution prior to said step of applying said layer; and
   storing said sprayed and soaked recovered screened material product for subsequent use as said substitute daily/initial solid waste landfill cover material.

18. A method as recited in claim 9 wherein said recovered screened material product is construction and demolition disposal debris recovered screened material product.

19. A method as recited in claim 18 further including the step of:
   combining said construction and demolition disposal debris recovered screened material product with Class III/commercial recovered screened material to create a blended product defining said substitute daily/initial solid waste disposal landfill cover material.

20. A method as recited in claim 18 further including the step of:
   combining said construction and demolition debris recovered screened material product with municipal solid waste recovered screened material to create a blended product defining said substitute daily/initial solid waste disposal landfill cover material.

21. A method as recited in claim 18 further including the step of:
   combining said construction and demolition debris recovered screened material product with automobile shredder residue recovered screened material to create a blended product defining said substitute daily/initial solid waste disposal landfill cover material.

22. A method as recited in claim 17 wherein said recovered screen material product is sprayed and soaked with said solution priorb to and during storing thereof to achieve a moisture content of at least 25%.

23. A method as recited in claim 12 wherein the moisture content of said recovered screen material product is maintained in the range of between 25%–35% while being stored.

* * * * *